(12) United States Patent
Liang et al.

(10) Patent No.: US 7,359,733 B2
(45) Date of Patent: Apr. 15, 2008

(54) BEAM SYNTHESIS METHOD FOR DOWNLINK BEAMFORMING IN FDD WIRELESS COMMUNICATION SYSTEM

(76) Inventors: Ying-Chang Liang, Blk. 301, Clementi Ave 4, #10-559, Singapore (SG) 120301; Francois Chin, Blk. 208, Serangoon Central, #02-228, Singapore (SG) 550208

( * ) Notice: Subject to any disclaimer, the term of this patent is extended or adjusted under 35 U.S.C. 154(b) by 1023 days.

(21) Appl. No.: 09/922,442

(22) Filed: Aug. 3, 2001

(65) Prior Publication Data

US 2002/0061768 A1 May 23, 2002

(30) Foreign Application Priority Data

Sep. 21, 2000  (SG) .............................. 200005413-0

(51) Int. Cl.
*H01Q 3/00* (2006.01)
*H04M 1/00* (2006.01)

(52) U.S. Cl. ................ 455/562.1; 342/368; 342/372; 342/373; 455/63.1; 455/63.4; 455/428; 455/562.1

(58) Field of Classification Search ............. 455/63.1, 455/63.4, 428, 562.1
See application file for complete search history.

(56) References Cited

U.S. PATENT DOCUMENTS 4,173,759 A * 11/1979 Bakhru ........................ 342/382
4,947,178 A * 8/1990 Shafai .................. 343/700 MS
5,349,364 A * 9/1994 Bryanos et al. .............. 343/853
5,555,257 A * 9/1996 Dent ............................ 370/319
5,619,503 A * 4/1997 Dent ............................ 370/330
5,714,932 A * 2/1998 Castellon et al. ...... 340/539.11
6,018,317 A * 1/2000 Dogan et al. ................ 342/378
6,141,567 A * 10/2000 Youssefmir et al. ..... 455/562.1
6,349,219 B1 * 2/2002 Hochwald et al. ........ 455/562.1
6,400,318 B1 * 6/2002 Kasami et al. .............. 342/383
6,411,015 B1 * 6/2002 Toda ............................ 310/334
6,615,024 B1 * 9/2003 Boros et al. ............. 455/67.14
6,694,155 B1  2/2004 Chin et al.

\* cited by examiner

*Primary Examiner*—Duc M. Nguyen
*Assistant Examiner*—Matthew Genack
(74) *Attorney, Agent, or Firm*—Hancock Hughey LLP (57) ABSTRACT

A method for downlink beamforming in a frequency-division-duplex wireless communications system comprising a base station with an antenna array and terminals that are physically remote from said base station, the method comprising the steps of: receiving at said base station antenna array combinations of arriving uplink signals from said plurality of remote terminals, estimating an uplink beamforming weight vector for each of said terminals from said combinations of arriving uplink signal; identifying uplink nulls and an uplink main beam position from said uplink beamforming weight vector; transforming each of said uplink nulls to form a corresponding downlink null; generating a downlink beamforming weight vector from all downlink nulls; and transmitting a set of information signals from said base station antenna array according to said downlink beamforming weights.

3 Claims, 9 Drawing Sheets

BEAM SYNTHESIS METHOD FOR DOWNLINK BEAMFORMING IN FDD WIRELESS COMMUNICATION SYSTEM

BACKGROUND OF THE INVENTION

The present invention relates in general to wireless communication systems and, more particularly, to using antenna array and signal processing techniques to increase downlink capacity and performance of wireless communication systems. The present invention relates to a new technique for generating downlink beamforming weights for frequency division-duplex (FDD) communication systems, which may include time division multiple access (TDMA), frequency division multiple access (FDMA), code division multiple access (CDMA) and their combinations.

The next generation of wireless mobile communication systems will be required to provide a variety of services including digital voice, video and data in different transmission modes. These services will require high rate data transmission and high received signal power level, thus creating increased interference among users. In order to obtain high system capacity and reliable transmission quality, the interference level has to be reduced dramatically. Spatial division multiple access (SDMA), by which a plurality of antenna elements are equipped at the base station in order to receive and transmit data information from and to the desired user by using spatial diversities, has been proposed as an effective technique to reduce this kind of interference.

The main operations in SDMA include uplink (from mobile station to base station) beamforming and downlink (from base station to mobile station) beamforming. Uplink beamforming consists of uplink beamforming weight generation and uplink signal demultiplexing; Downlink beamforming includes downlink beamforming weight generation and downlink signal multiplexing. Theoretically, in both links, the associated channel responses are of critical importance in order to generate the corresponding beamforming weights.

Whilst much attention has been paid to uplink capacity enhancement, it is also desirable to improve downlink performance in order to increase the whole system capacity. Moreover, downlink capacity is even more important for the next generation of communication systems in which wireless internet, video-on-demand and multimedia services are to be implemented.

There are many different configurations of antenna array, of which the most popular and widely used one is uniform linear array (ULA), due to its easy implementation, and simplicity in estimating direction-of-arrival (DOA) information.

There are two duplex multiplexing modes for wireless communication systems: time-division-duplex (TDD) mode, and frequency-division-duplex (FDD) mode. For TDD mode, uplink and downlink employ the same carrier frequency, but are assigned different time slots. This mode makes downlink beamforming easy, but requires accurate synchronization between uplink and downlink transmissions. To this end, a guard time period is usually inserted, which may greatly degrade the transmission efficiency. In FDD mode, on the other hand, both links use different carrier frequencies, thus the transmissions in these two links are independent, and no coordination is required. The FDD scheme is adopted in most current wireless communication systems, and most probably will be used in the next generation systems. For FDD systems, there is no direct measurement of downlink channel responses at the base station, which makes downlink beamforming more difficult than its uplink counterpart. One method for simplifying the downlink beamforming problem is based on the use of direction-of-arrival (DOA) information embedded in received uplink signals. In fact, since uplink and downlink signals travel through reflections and deflections due to the same scatters surrounding the mobile and the base station, the DOAs of the uplink signals might be the only constant parameters which can be used for solving the downlink beamforming problem.

DOA-based approaches employ the received uplink signals to compute the desired user's DOAs first; then downlink channel responses are constructed using the existing relationship between uplink and downlink steering vectors; finally downlink beamforming weights are chosen to be the same as the corresponding downlink channel responses. In WO 97/45968, "Method of and apparatus for interference rejection combining and downlink beamforming in a cellular radiocommunications system", Forssen et al proposed to compute the probability function with respect to different DOAs at which the desired signal may come from, and to choose the angle of incidence associated with the particular mobile station as the DOA value which maximises the probability function. This technique, however, suffers from a heavy computational burden in computing the probability function and searching for the maximum point. In WO 96/22662, "Spectrally efficient high capacity wireless communication systems", Barratt et al use subspace-based techniques (e.g., MUSIC and ESPRIT) to obtain high-resolution DOA estimates from the covariance matrix of the antenna outputs. It is well known that subspace-based algorithms require very complicated computations since they are involved in the computation of matrix inversion or singular value decomposition of complex matrices, and one or even more multidimensional non-linear optimisations. Unfortunately, accurate DOA estimates are not available in multipath cases since the number of multipath DOAs are usually greater than the number of antenna elements. This may limit the applicability of the DOA-based approaches for downlink beamforming in wireless communication systems. Further, DOA-based approaches are based on the promise of keeping the main beam of the downlink beam pattern directed toward the intended user, but do not take into account the interference pollution to other users who are not intended to receive the signal, thus such DOA-based approaches are far from the optimal solution in terms of system capacity.

If downlink channel responses are really available, F. Rashid-Farroki et al proposed a virtual uplink beamforming and power control technique (UBPCT) to generate downlink beamforming weights for TDMA and CDMA without multipath case, see "Transmit beamforming and power control for cellular wireless systems", *IEEE Journal of Selected Areas in Communications*, vol. 16, No. 8, 1998, pp. 1437-1449. In Singapore patent application, No. 9904733.4, entitled "Downlink beamforming method for capacity enhancement in wireless communication systems", filed on 24 Sep. 1999, Y. Liang et al proposed a modified UBPCT, which is suitable for direct sequence code division multiple access (DS-CDMA) with multi-delay paths and considering the orthogonality of downlink codes as well as the multi-rate services. The virtual UBPCT methods are based on the criterion of minimising the total transmitted power while maintaining the SIR requirements, which is physically meaningful from the view point of downlink power limitation, as well as of minimising the interference pollution to the outer cells, thus of increasing the multi-cell capacity.

Therefore, the downlink beamforming weights generated by the virtual UBPCT are actually the optimal solutions of downlink beamforming problem in terms of capacity enhancement.

Virtual UBPCT is more computationally efficient than the traditional downlink beamforming approach in the sense that no multi-variable optimisation is required. However, this method still requires matrix inversion and some iterative computations. More seriously, this method requires the downlink channel responses, which can be difficult to obtain at the base station.

SUMMARY OF THE INVENTION

In view of the above, it is a primary object of this invention to seek to provide a practical, inexpensive and efficient method for realising downlink beamforming. In particular, it is an object of the invention to seek to provide a method of generating downlink beamforming weights using uplink beamforming weights, which comprise information already available at the base station.

In uplink beamforming, real UBPCT is used to generate the optimal uplink beamforming weights by minimising the transmitted powers individually, and maximising the single-cell as well as multi-cell capacity. For FDD systems, if the uplink beamforming weights are used for downlink directly, not only the main beam, but also the nulls of the generated downlink beam pattern may have certain DOA shifts, which may greatly degrade the performance and capacity for downlink. By considering the similarity between real UBPCT for uplink and virtual UBPCT for downlink, for FDD systems, the generated uplink beam pattern using real UBPCT should be similar to the generated downlink beam pattern using virtual UBPCT, especially for the positions of main beam and nulls. Based on this observation, the present invention provides a beam synthesis (BES) method for generating downlink beamforming weights by modifying uplink beamforming weights directly. This method is simple in the sense that it does not require the downlink channel responses; also, no complicated computations, such as multi-variable optimization or matrix inversion, are involved.

In contrast to the null constraint (NC) method proposed in Singapore patent application No. 9904733.4, the BES method embodying this invention tries to constrain not only the same null positions, but also the same main beam positions for both links. In fact, the NC method may produce pseudo nulls for downlink due to FDD, incurring the null-wrapping phenomenon. If the generated pseudo null is far away from the desired user's DOA, which is usually inside the main beam for CDMA, the null-wrapping problem is not harmful to the main beam. However, if the generated pseudo null is near the desired user's DOA, the generated downlink beam pattern's main beam will be destroyed, which may greatly degrade the performance of the whole system. Such performance degrading nulls are termed bad nulls.

The BES method of this invention uses the following techniques, or any two or more of their combinations to prevent the null-wrapping phenomenon from occurring or alleviating the effect of any bad nulls.

Proper selection of antenna spacing for the antenna array;

The use of sectorisation;

Null-moving method, i.e., artificially moving bad nulls to a safe position.

The basic properties and benefits of the present invention are summarised as follows:

1. The main concern complicating FDD systems is the lack of downlink channel vector estimates. The present invention does not require downlink channel responses for generating downlink beamforming weights.

2. The present invention is simple for implementation as it does not require complicated computations nor large space for data storage.

Accordingly, the present invention provides a method for downlink beamforming in a frequency-division-duplex wireless communications system comprising a base station with an antenna array and terminals that are physically remote from said base station, the method comprising the steps of:

receiving at said base station antenna array combinations of arriving uplink signals from said plurality of remote terminals, estimating an uplink beamforming weight vector for each of said terminals from said combinations of arriving uplink signal;

identifying uplink nulls and an uplink main beam position from said uplink beamforming weight vector;

transforming each of said uplink nulls to form a corresponding downlink null; generating a downlink beamforming weight vector from all downlink nulls; and transmitting a set of information signals from said base station antenna array according to said downlink. beamforming weights.

Conveniently, the transforming step comprises the sub-steps of:

categorising each of said uplink nulls as either bad uplink nulls or good uplink nulls;

reassigning all bad uplink nulls to form corrected uplink nulls;

forming downlink nulls by scaling the phase of both said good uplink nulls and corrected uplink nulls according to a factor that is related to the ratio of the downlink operating frequency to the uplink operating frequency.

Advantageously, within the categorising step the said uplink null $\theta_{u,k}$ is marked bad if it satisfies the existence-of-pseudo-null condition $|\theta_{u,k}| \geq |\theta_0|$, where $$\theta_0 = \arcsin\left(\frac{\lambda_d}{z} - 1\right)$$

is the null wrapping DOA threshold, $\lambda_d$ being the downlink wavelength and $z$ the antenna spacing, and its corresponding pseudo null in the downlink beam pattern lies within a specified proximity of said main beam position of the uplink beam method.

Preferably, the reassigning step resets each of said bad nulls to be within the interval $[-|\theta_0|, |\theta_0|]$.

Conveniently, the reassigning step resets each of said bad nulls to 0°.

Advantageously, the reassigning step further includes the substeps of identifying substantially the DOAs of all terminals and resetting all bad nulls to the said set of DOAs corresponding to the highest data rate terminals and/or large numbers of closely located interfering terminals.

A further aspect of the present invention provides a method for downlink beamforming in a frequency-division-duplex wireless communications system comprising a base station with an antenna array and terminals that are physically remote from said base station, the method comprising the steps of:

selecting an antenna spacing for antennas in the array;

receiving at said base station antenna array combinations of arriving signals from said plurality of remote terminals, each signal having a beam pattern incorporating a main beam and one or more nulls;

identifying an uplink beamforming weight for a signal; and generating a downlink beamforming weight based on the signal's uplink beamforming weight;

transmitting downlink signals using downlink beamforming weights.

Conveniently, the antenna spacing for the antenna array is selected to be less than or equal to half of the downlink wavelength, thereby avoiding the null wrapping phenomenon.

Advantageously, the antenna spacing for the antenna array is selected to be greater than half of the downlink wavelength and less than or equal to half the uplink wavelength, thereby alleviating the null-wrapping phenomenon.

Preferably, the antenna spacing for the antenna array is selected to be equal to a quarter of the sum of the downlink wavelength and the uplink wavelength.

A further aspect of the present invention provides a method for downlink beamforming in a frequency-division-duplex wireless communications system comprising a base station with an antenna array defining a communication cell and terminals that are physically remote from said base station, the method comprising the steps of:

dividing the communication cell into a plurality of sectors;

identifying uplink nulls which would yield pseudo nulls in a sector;

constraining use of the system to those terminals in a sector in which no pseudo nulls will be generated;

receiving at said base station antenna array combinations of arriving signals from said plurality of remote terminals, each signal having a beam pattern incorporating a main beam and one or more nulls;

identifying an uplink beamforming weight for a signal; and generating a downlink beamforming weight based on the signal's uplink beamforming weight; and transmitting downlink signals using downlink beamforming weights.

Another aspect of the present invention provides a method for downlink beamforming in a frequency-division-duplex wireless communications system comprising a base station with an antenna array and terminals that are physically remote from said base station, the method comprising a combination of the method steps of two or more of claims 1, 7 and 11.

A further aspect of the present invention provides a base station for a wireless communications system, the base station comprising:

an uplink receiver antenna array for receiving arriving signals from a plurality of remote terminals on respective uplink channels;

a downlink weight generator operable to generate downlink weights based on a signal's uplink beamforming weight;

a downlink transmit antenna array to transmit signals to the remote terminals in accordance with the generated downlink weights; and means to move at least one of the downlink nulls to a safe position.

Another aspect of the present invention provides a base station for a wireless communications system, the base station comprising:

an uplink receiver antenna array for receiving arriving signals from a plurality of remote terminals on respective uplink channels, the array having a predetermined antenna spacing to alleviate null-wrapping;

a downlink weight generator operable to generate downlink weights based on a signal's uplink beamforming weight;

a downlink transmit antenna array to transmit signals to the remote terminals in accordance with the generated downlink weights.

A further aspect of the present invention provides a base station for a wireless communications system, the base station comprising:

an uplink receiver antenna array for receiving arriving signals from a plurality of remote terminals on respective uplink channels;

a downlink weight generator operable to generate downlink weights based on a signal's uplink beamforming weight;

a downlink transmit antenna array to transmit signals to the remote terminals in accordance with the generated downlink weights, the transmission cell of the antenna array being divided into a plurality of sectors;

means to identify uplink nulls which would yield pseudo nulls in a sector; and means to constrain use of the system to those terminals in a sector in which no pseudo nulls will be generated.

Another aspect of the present invention provides a communication system incorporating a base station according to any one of claims 13 to 15 and a plurality of remote terminals.

A further aspect of the present invention provides a method substantially as hereinbefore described with reference to and as shown in the accompanying drawings.

Another aspect of the present invention provides a base station substantially as hereinbefore described with reference to and as shown in the accompanying drawings.

A further aspect of the present invention provides a wireless communication system substantially as hereinbefore described with reference to and as shown in the accompanying drawings.

BRIEF DESCRIPTION OF DRAWINGS

In order that the present invention may be more readily understood, embodiments thereof will now be described by way of example, with reference to the accompanying drawings in which.

DETAILED DESCRIPTION

Figure 1:
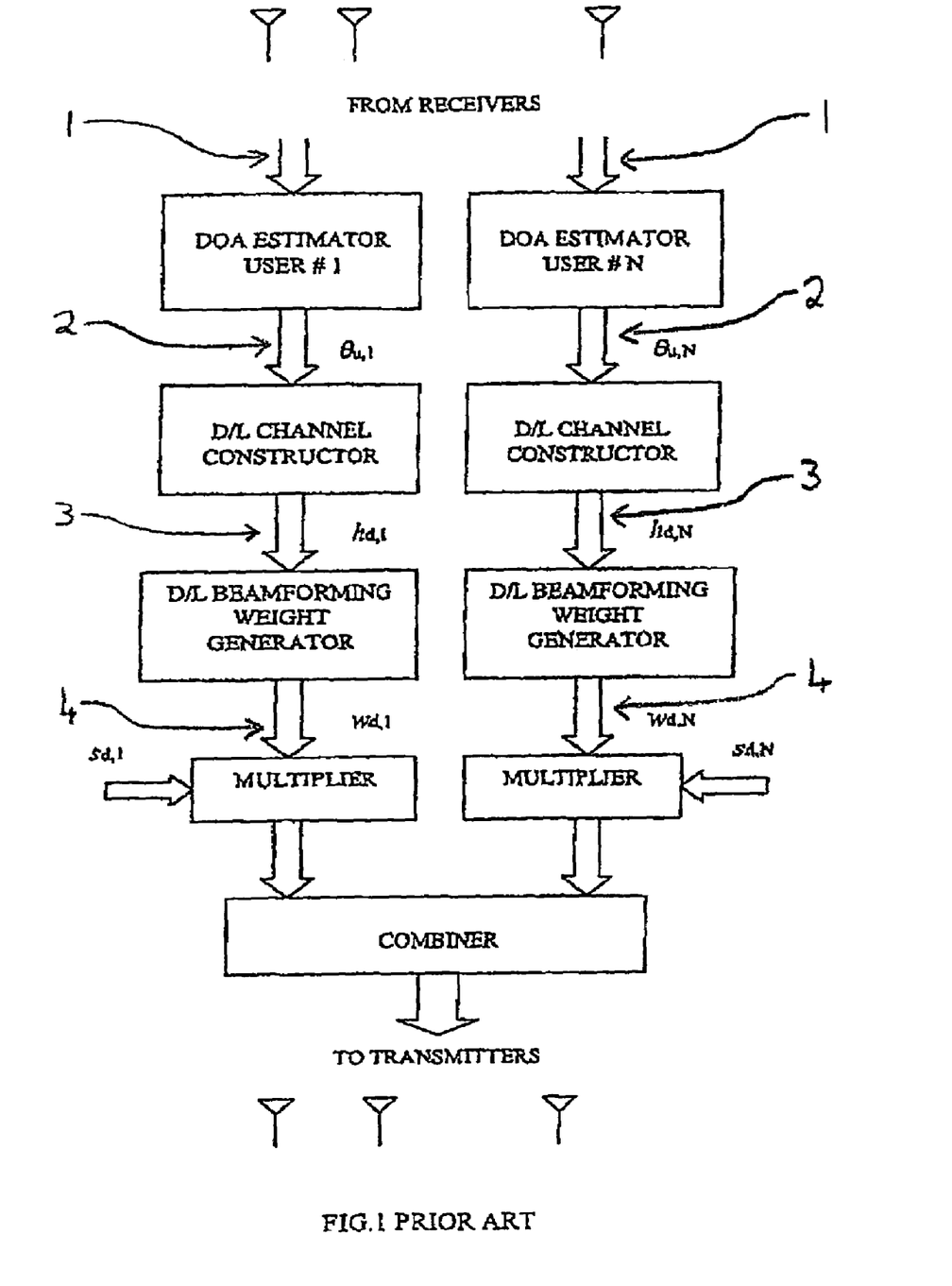
FIG. 1 is a graphic illustration of prior downlink beamforming schemes.

FIG. 1 shows the block diagram of a downlink beamforming scheme according to prior art for improving downlink performance and capacity using base station antenna array. A plurality of mobile users share the same channels which can be a time slot for TDMA, a frequency band for FDMA or a set of spreading codes for CDMA. Using a plurality of transceivers, higher system capacity and better transmission performance can be achieved if proper uplink and downlink beamforming schemes are employed.

The prior art systems first estimate each user's DOA values 2 from the received uplink signals 1, then construct the downlink channel responses (DCRs) 3 using downlink steering vectors for the estimated DOAs. Finally, the DCRs are set as the downlink beamforming vectors 4. As discussed in the first section of this application, the prior art system is very complicated in the sense that all users' DOAs are to be estimated; also, this system cannot provide enough downlink capacity to match its uplink counterpart.

Figure 2:
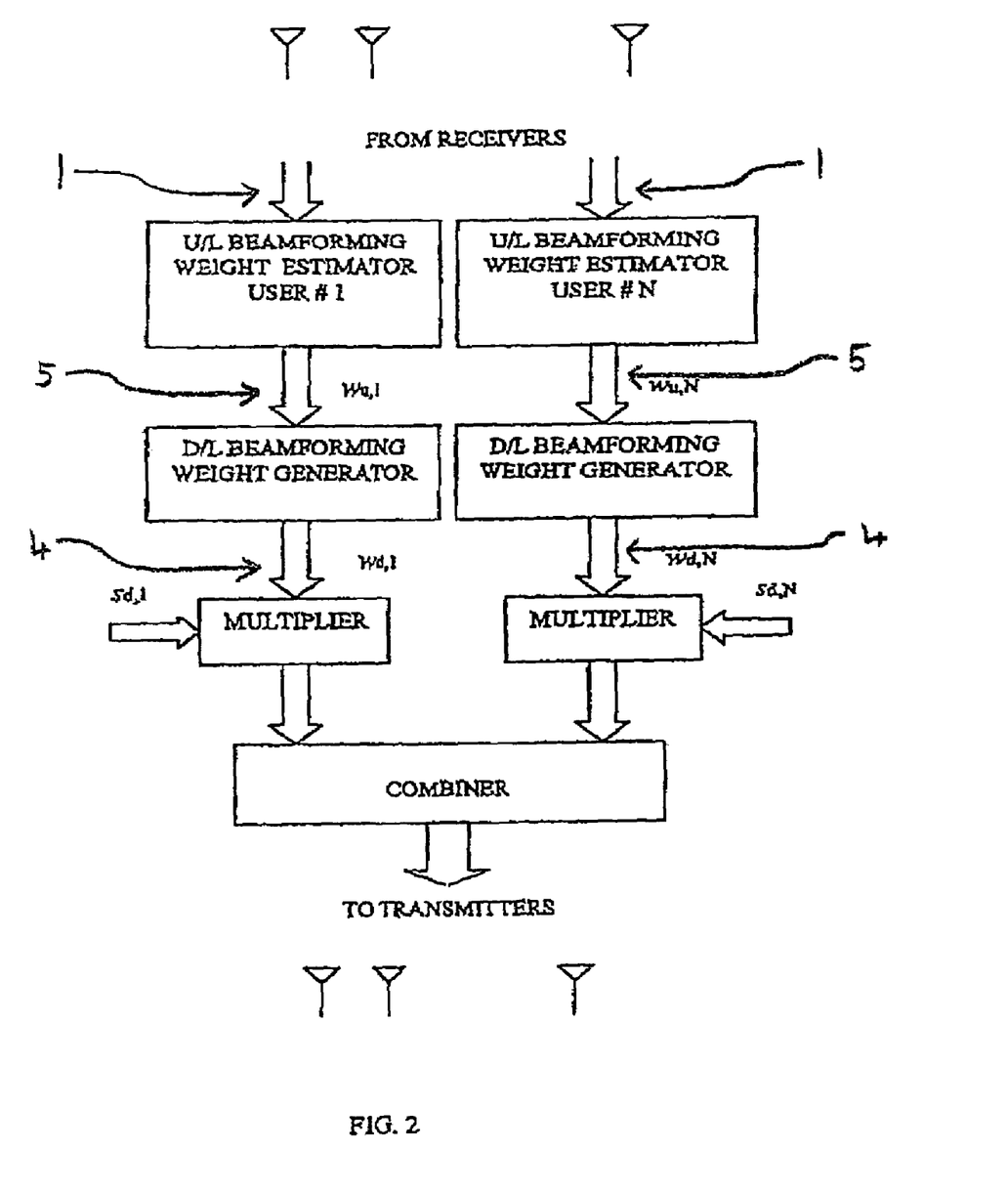
FIG. 2 is a graphic illustration of the downlink beamforming scheme using uplink weights in accordance with an embodiment of the present invention.

FIG. 2 illustrates how embodiments of the system and method of the present invention can overcome this problem. The received signals 1 are first passed to generate uplink beamforming weights 5, with which the desired signals are separated by using demultiplexing. The uplink beamforming weights 5 are then used to generate downlink beamforming weights 4. One example of a technique for generating downlink beamforming weights is a null constraint method described in Singapore Patent Application No. 9904733.4. The signals to be transmitted to the individual mobile users are multiplexed first with the downlink beamforming weights 4; then transmitted to the physical channels.

A DS-CDMA system is used to describe how and why the uplink beamforming weights 5 are modified to generate downlink beamforming weights 4. Suppose N mobile users share the same sector in which an M-element uniform linear array (ULA) is provided. Narrowband signals are spread to wideband signals using different spreading codes. For uplink, signals received at the base station antenna array are first despread, then passed into an adaptive beamformer with uplink beamforming weights 5, followed by a Rake combiner. For downlink, signals to be transmitted are first multiplexed at the base station antenna array using downlink beamforming weights 4, then transmitted through physical channels: At the mobile terminals, Rake combiners are employed in order to detect the information signal.

A 2-layered code structure consisting of short spreading codes and long scrambling codes is employed. The scrambling codes are assigned specifically to each user for uplink, and to each cell for downlink. Multicode spreading scheme is used for multirate transmission. Let $h_{u,k}^{(l)}(t)$ and $\tau_{u,k}^{(l)}$ be channel responses and time delays of user k, respectively and, $s_{u,k}(t)$ is the kth uplink transmitted signal. The received signal x(t) at the base station can be written in a vector form as $$x(t) = \sum_{k=1}^{N} \sum_{l=1}^{L_k} h_{u,k}^{(l)}(t) s_{u,k}\left(t - \tau_{u,k}^{(l)}\right) + n(t) \quad (1)$$

where n(t) is the receiver background noise vector, each element of which is an independent additive white Gaussian noise (AWGN) with one-sided spectrum density $N_0$. For downlink, let $w_{d,j}$ denote the per-user-per-weight (PUPW) downlink beamforming weight vector for user j, and assume the users have the same number of uplink and downlink delay paths. The received signal $r_k(t)$ at mobile user k is given by $$r_k(t) = \sum_{j=1}^{N} \sum_{l=1}^{L_k} w_{d,j}^H h_{d,k}^{(l)}(t) s_{d,k}\left(t - \tau_{d,k}^{(l)}\right) + u_k(t) \quad (2)$$

where $h_{d,k}^{(l)}(t)$ and $\tau_{d,k}^{(l)}$ denote the downlink channel vector and time delay corresponding to the lth path of user k, respectively; $s_{d,k}(t)$ is the kth downlink transmitted signal; and $u_k(t)$ is AWGN received at mobile k. It is assumed the one-sided spectrum density of $u_k(t)$ is $N_{d,k}$.

To establish uplink and downlink channel models, user k's lth delay path is considered. Let $\theta_1 < \theta_2 < \ldots < \theta_p$ be the DOAs of the multipath components; $a_u(\theta_l)$ be the uplink steering vector for signals arriving from the ith DOA, which is given by $$a_u(\theta_l) = [, e^{j2\pi z \sin(\theta_l)/\lambda_u}, \ldots, e^{j2\pi(M-1)z \sin(\theta_l)/\lambda_u}] \quad (3)$$

where z is antenna spacing, and $\lambda_u$ is uplink wavelength. The antenna spacing is usually chosen to be half the uplink wavelength in order for uplink signals to preserve the DOA information without ambiguity. By denoting $a_{u,i}(t)$ as the complex path strength of the signal coming from the ith DOA, the uplink channel response is given by $$h_{u,k}^{(l)}(t) = \sum_{i=1}^{p} \alpha_{u,i}(t) a_u(\theta_i) \quad (4)$$

For FDD systems, according to reciprocal law, only the DOAs remain unchanged for uplink and downlink transmissions. Thus, the downlink channel response can be written as $$h_{d,k}^{(l)}(t) = \sum_{i=1}^{p} \alpha_{d,i}(t) a_d(\theta_i) \quad (5)$$

where $a_d(\theta_l)$ is the downlink steering vector at DOA $\theta_l$, which is given by $$a_d(\theta_l) = [, e^{j2\pi z \sin(\theta_l)/\lambda_d}, \ldots, e^{j2\pi(M-1)z \sin(\theta_l)/\lambda_d}] \quad (6)$$

with $\lambda_d$ being downlink wavelength, and $\alpha_{d,i}(t)$ the downlink complex path strength of the signal leaving for the ith DOA component.

To minimise each mobile's transmitted power individually, uplink uses real UBPCT method to generate uplink beamforming weights. Downlink employs virtual UBPCT method to generate downlink beamforming weights in order to minimise the total transmitted power. Real and virtual UBPCTs involve the following similar iterative steps.

(1) Choose an initial real (virtual) uplink power vector;

(2) Compute the real (virtual) uplink weight vectors for given real (virtual) uplink power vector;

(3) Adjust the real (virtual) uplink power vector for given real (virtual) uplink weight vectors; and (4) Update (2) and (3) until the power and weight vectors are converged.

In real UBPCT, the real uplink channel responses are involved in the adaptive process. In virtual UBPCT, however, the downlink channel responses are set to be the virtual uplink channel responses, and the generated virtual uplink beamforming weights are used as the real downlink beamforming weights. In Steps (2) and (3), orthogonality of downlink codes has been considered for virtual UBPCT. However, when the number of multipaths becomes large, or the orthogonality of downlink codes is ignored, the real UBPCT is actually the counterpart of the virtual UBPCT.

Compare now the uplink and downlink beam patterns generated by the real and virtual UBPCTs. Denote $w_{u,k}=[w_{u,k}(1), \ldots, w_{u,k}(M)]$ and $w_{d,k}=[w_{d,k}(1), \ldots, w_{d,k}(M)]$ as, respectively, the converged uplink and downlink beamforming weight vectors for the kth user. Although the generated uplink beam response, $P_{u,k}(\theta)=|w_{u,k}^H a_u(\theta)|^2$, is not always equal to the generated downlink one, $P_{d,k}(\theta)=|w_{d,k}^H a_d(\theta)|^2$, at every DOA, these two responses do have some similarities, especially for the main beam and null positions, which are of vital importance for both links. As we are more concerned about how to increase the system capacity or how to support more high rate users using adaptive antenna array, we consider the cases in which the system is working at or near full capacity, or the system has some very high rate users. In those cases, on one hand, both uplink and downlink direct their main beams toward the desired user; and on the other hand, uplink employs nulls to null out stronger interfering users, such as high rate users, while for downlink, nulls are directed to high rate users such that these users will receive less interference pollution. In particular, the criteria of using nulls in this way are that, for uplink, all users' transmitted powers are minimised individually; while for downlink, the total transmitted power is minimised in order for all users to work in the prescribed SINR values. Therefore, for symmetric traffic environment, both links' patterns put common nulls at the high rate users, whilst maintaining the same main beams.

Figure 3:
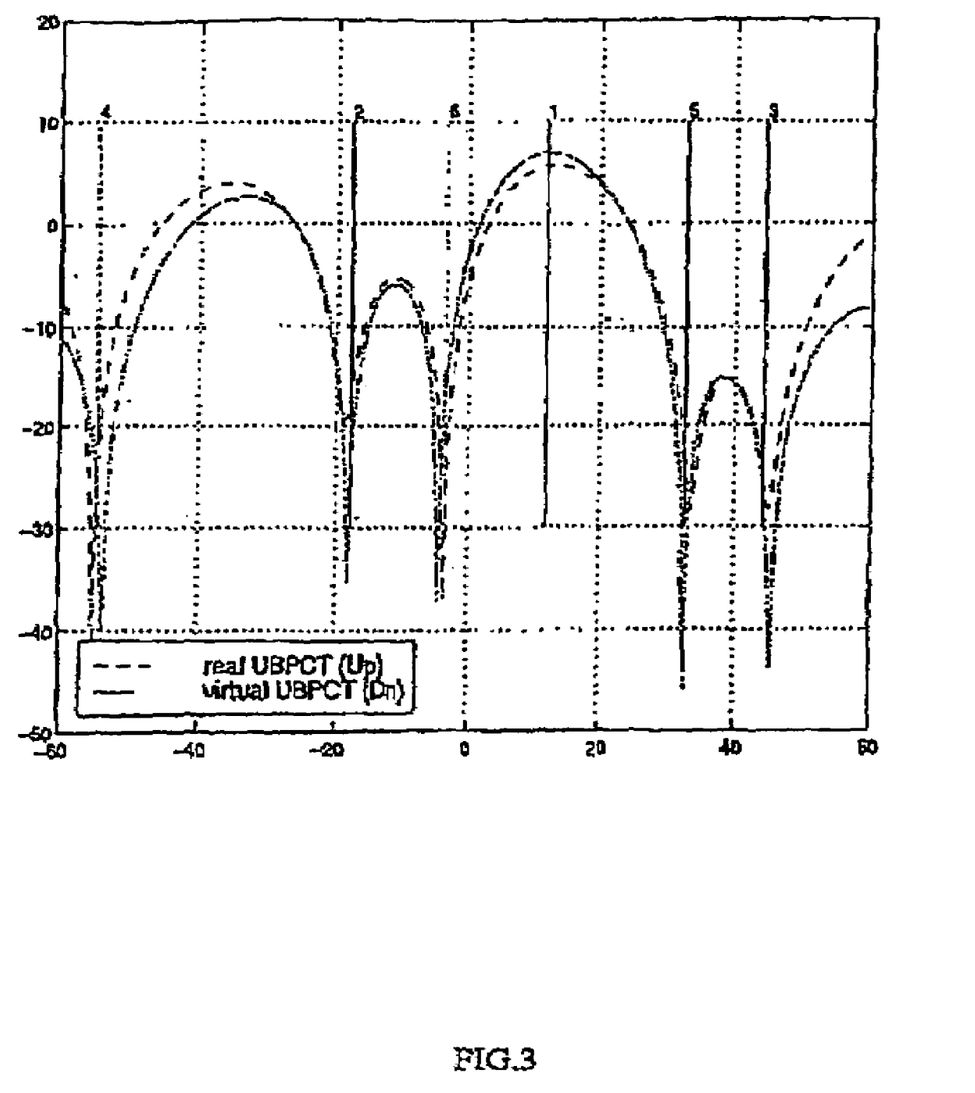
FIG. 3 shows the generated beam patterns for uplink and downlink using real and virtual UBPCTs.

FIG. 3 shows the generated uplink and downlink. beam patterns using real and virtual UBPCTs, respectively. Here, user 1 is the intended user, users 2-6 are interfering users, the uplink frequency $f_u$=1.8 GHz, the downlink frequency $f_d$=2.0 GHZ, and the processing gain is 16. It can be seen from FIG. 3 that both links have very near positions for both main beams and nulls.

Figure 4:
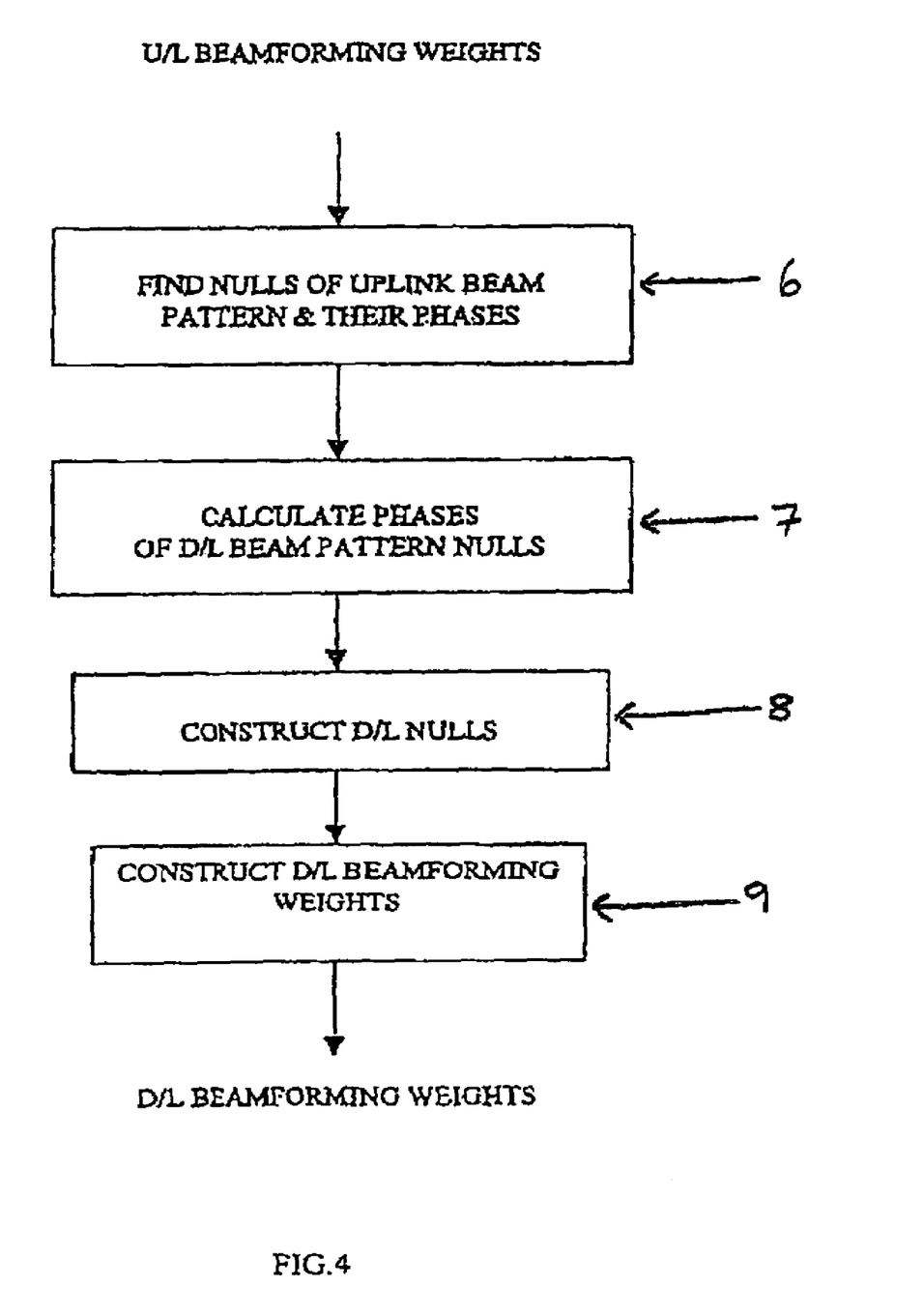
FIG. 4 illustrates the downlink beamforming weight generator using a null constraint (NC) method in accordance with the prior art.

FIG. 4 illustrates the downlink beamforming weight generator using the null constrained (NC) method proposed in Singapore patent application No. 9904733. The NC method consists of the following steps.

Determine the uplink beam patterns nulls 6, $z_{u,k}(i)$, i= 1, . . . , M−1, using the polynomial formed from the uplink weights:

$$\sum_{i=1}^{M} w_{u,k}(i) z^{-i+1} = w_{u,k}(1)(1 - z_{u,k}(1)z^{-1}) \ldots (1 - z_{u,k}(M-1)z^{-1}); \quad (7)$$

Transform the phase components of the uplink beam pattern's nulls, and obtain the phase components of downlink beam pattern's nulls 7 as $$\varphi_{d,k}(i) = \frac{f_d}{f_u} \varphi_{u,k}(i), \text{ where } z_{u,k}(i) = A_{u,k}(i) e^{j\varphi_{u,k}(i)},$$

for $i = 1, \ldots, M-1$;

Construct the downlink beam pattern's nulls 8 as $zd_{,k}(i) = A_{d,k}(i) = A_{d,k}(i) e^{j\phi_{d,k}(i)}$, for i=1, . . . , M−1; and Construct the downlink beamforming weight vector 9:

$$\sum_{i=1}^{M} w_{d,k}(i) z^{-i+1} = w_{d,k}(1)(1 - z_{d,k}(1)z^{-1}) \ldots (1 - z_{d,k}(M-1)z^{-1}) \quad (8)$$

In constructing the downlink nulls 8, we may choose $A_{d,k}(i)A_{u,k}(i)$ or simply $A_{d,k}(i)=1$ for i=1, . . . , M−1.

Figure 5:
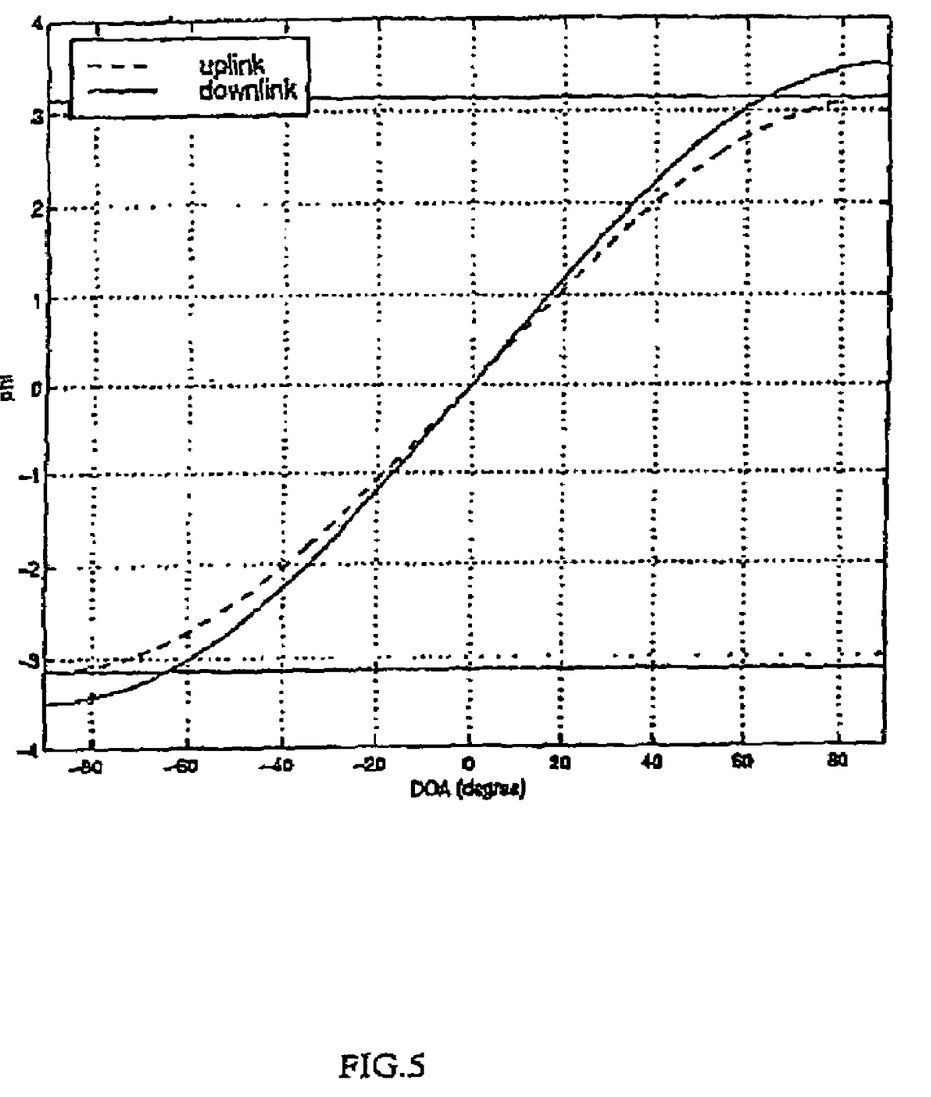
FIG. 5 shows the phase values of the first element of the uplink and downlink steering vectors for $z=\lambda_u/2$, $f_u=1.8$ GHz, $f_d=2.0$ GHZ.

Converting uplink weights into downlink weights via the above NC method will incur the null-wrapping phenomenon for ULA. Specifically, since the downlink carrier frequency is usually greater than the uplink one, if the antenna spacing is $z=\lambda_u/2$, even though uplink beam pattern has M−1 nulls, the generated downlink beam pattern using NC method may have more than M−1 nulls. This becomes clear from FIG. 5, which shows the phase values of the second element of the uplink and downlink steering vectors for $z=\lambda_u/2$, $f_u$=1.8 GHz, $f_d$=2.0 GHZ. It is seen from FIG. 5 that the uplink phase ($\phi_u$), $2\pi z \sin(\theta)/\lambda_u$, is within the interval $[-\pi,\pi]$, while the downlink phase ($\phi_d$), $2\pi z \sin(\theta)/\lambda_d$, may be outside the interval $[-\pi,\pi]$, which may cause the null-wrapping phenomenon due to the periodicity of the downlink steering vector. More specifically, if the antenna spacing is chosen to be $z>\lambda_d/2$, by considering the definition of downlink beam response, $P_{d,k}(\theta)=|w_{d,k}^H a_d(\theta)|^2$, and using the downlink steering vector given in (6), if $\theta_1$ is one null's DOA satisfying $$|\sin(\theta_1)| \geq \frac{\lambda_d}{z} - 1, \text{ i.e., } |\theta_1| \geq \arcsin\left(\frac{\lambda_d}{z} - 1\right),$$

there exists a pseudo null located at $\theta_2$, whose value is determined by $$\sin(\theta_2) = \sin(\theta_1) + \frac{\lambda_d}{z}, \text{ if } \sin(\theta_1) < 0 \quad (9)$$

or $$\sin(\theta_2) = \sin(\theta_1) - \frac{\lambda_d}{z}, \text{ if } \sin(\theta_1) > 0 \quad (10)$$

Therefore, a pair of nulls, $(\theta_1, \theta_2)$, will be generated if we constrain the uplink null $\theta_1$ into downlink. This is termed the null-wrapping phenomenon, and $\theta_0$ is the DOA threshold for yielding this phenomenon, or null-wrapping DOA threshold for short, where $$\theta_0 = \arcsin\left(\frac{\lambda_d}{z} - 1\right).$$

If the uplink nulls are outside the interval $[-\theta_0, \theta_0]$, they will yield pseudo nulls when constrained for downlink. For $z=\lambda_u/2$, $f_u=1.8$ GHz, and $f_d=2.0$ GHz, $\theta_0=53.1°$.

When the uplink main beam is far away from the generated pseudo null $\theta_2$, the null-wrapping phenomenon will not cause a serious problem. However, if $\theta_2$, is near the uplink main beam's DOA, the generated downlink main beam using the above NC method will change greatly due to the introduction of the new null at $\theta_2$. In the extreme, if the desired user's DOA is equal to $\theta_2$, the generated downlink beam pattern will put a null at $\theta_2$, which means that the signal power will never be transmitted to the desired user, thereby the downlink performance of the whole system will be greatly degraded. The null $\theta_1$, which generates a pseudo null $\theta_2$ near the main beam is termed a bad null.

If the bad nulls are kept for downlink, the main beam will not be maintained. In order to maintain the main beam for downlink, it is desirable to modify the bad nulls.

Figure 6:
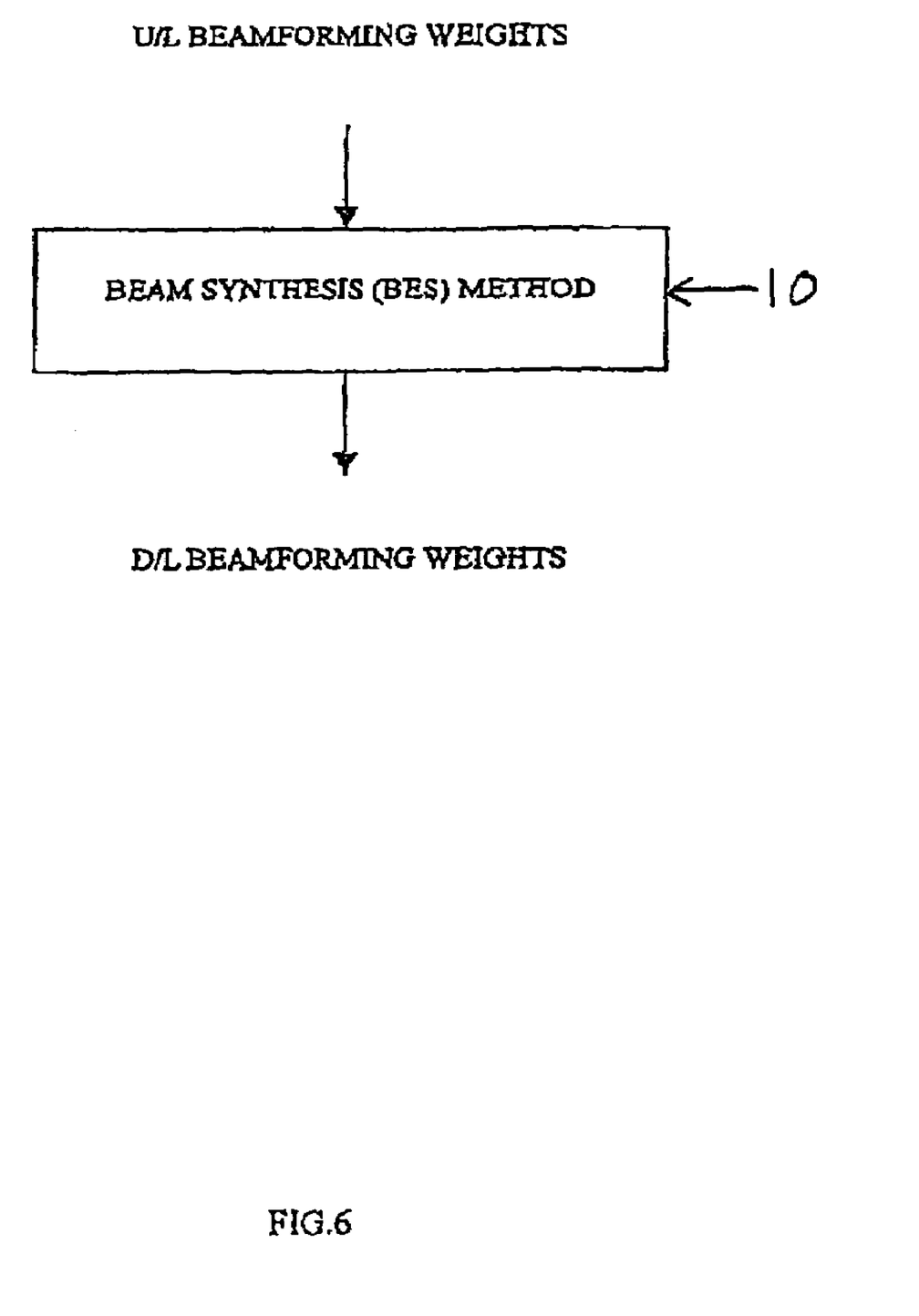
FIG. 6 illustrates the downlink beamforming weight generator using beam synthesis (BES) method in accordance with an embodiment of the present invention.

In view of the similarities between the generated beam patterns using real and virtual UBPCTs, according to embodiments of the present invention, downlink beamforming weights can be generated by modifying uplink beamforming weights via a beam synthesis (BES) method 10, shown in FIG. 6. This method tries to constrain the same positions for nulls and main beams of both links' beam patterns.

According to embodiments of the present invention, the null-wrapping phenomenon is either completely removed of alleviated by the following methods, or their combinations:

Proper selection of antenna spacing for the antenna array; and/or

The use of sectorisation.

The above methods referred to as pre-processing methods, and they should be taken into consideration when the system is designed. If bad nulls still exist in the system after the system parameters are determined, null-moving methods, which artificially move the bad nulls to safe positions, should be used. Null-moving methods are referred to as post-processing methods.

Figure 7:
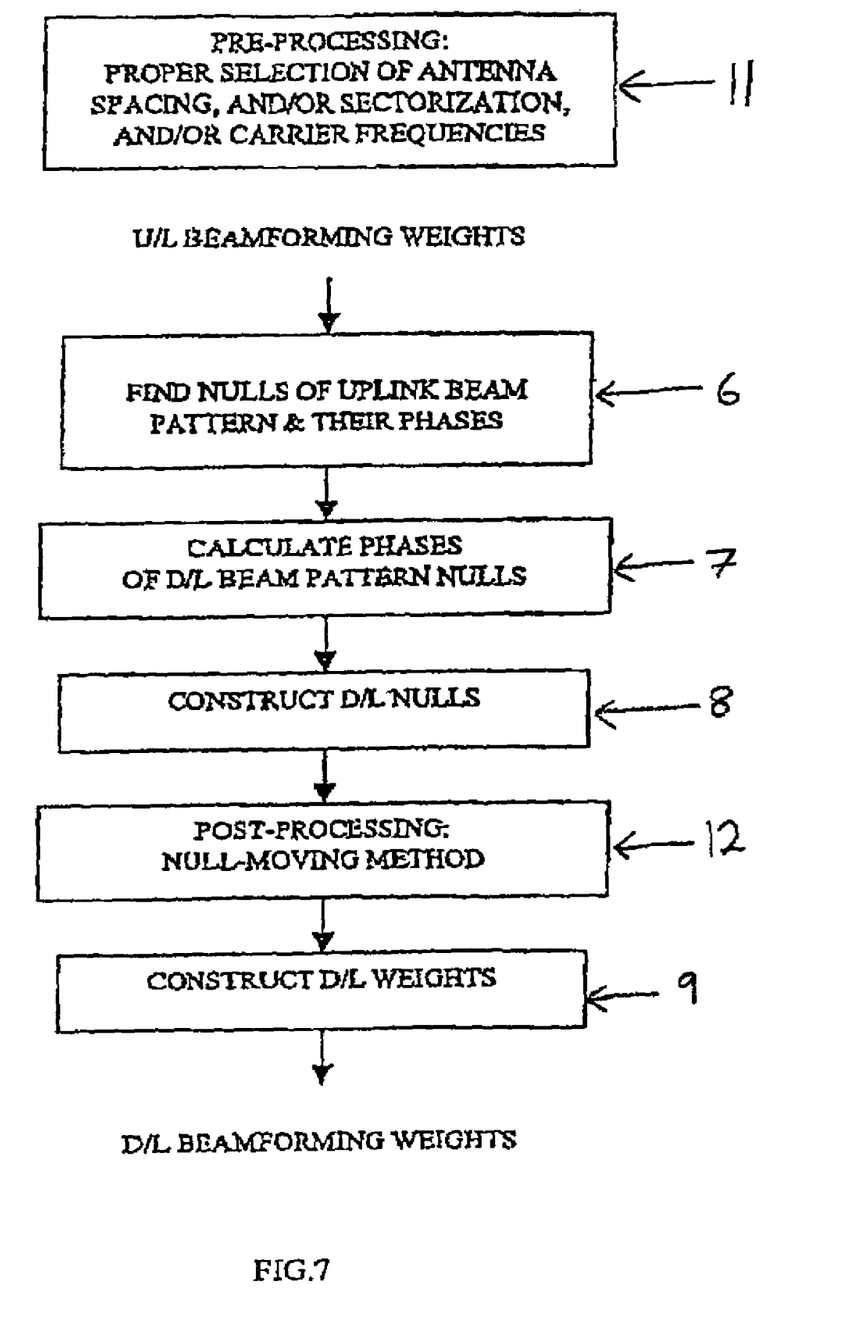
FIG. 7 illustrates the detailed description of the downlink beamforming weight generator using beam synthesis (BES) method in accordance with an embodiment of the present invention.

FIG. 7 illustrates a schematic flow chart of an embodiment of the BES method, which incorporates some pre-processing techniques 11, such as the selection of antenna spacing, and sectorisation and a post-processing technique, such as a null-moving method. These pre- and post-processing techniques can be used individually, or jointly.

Figure 8:
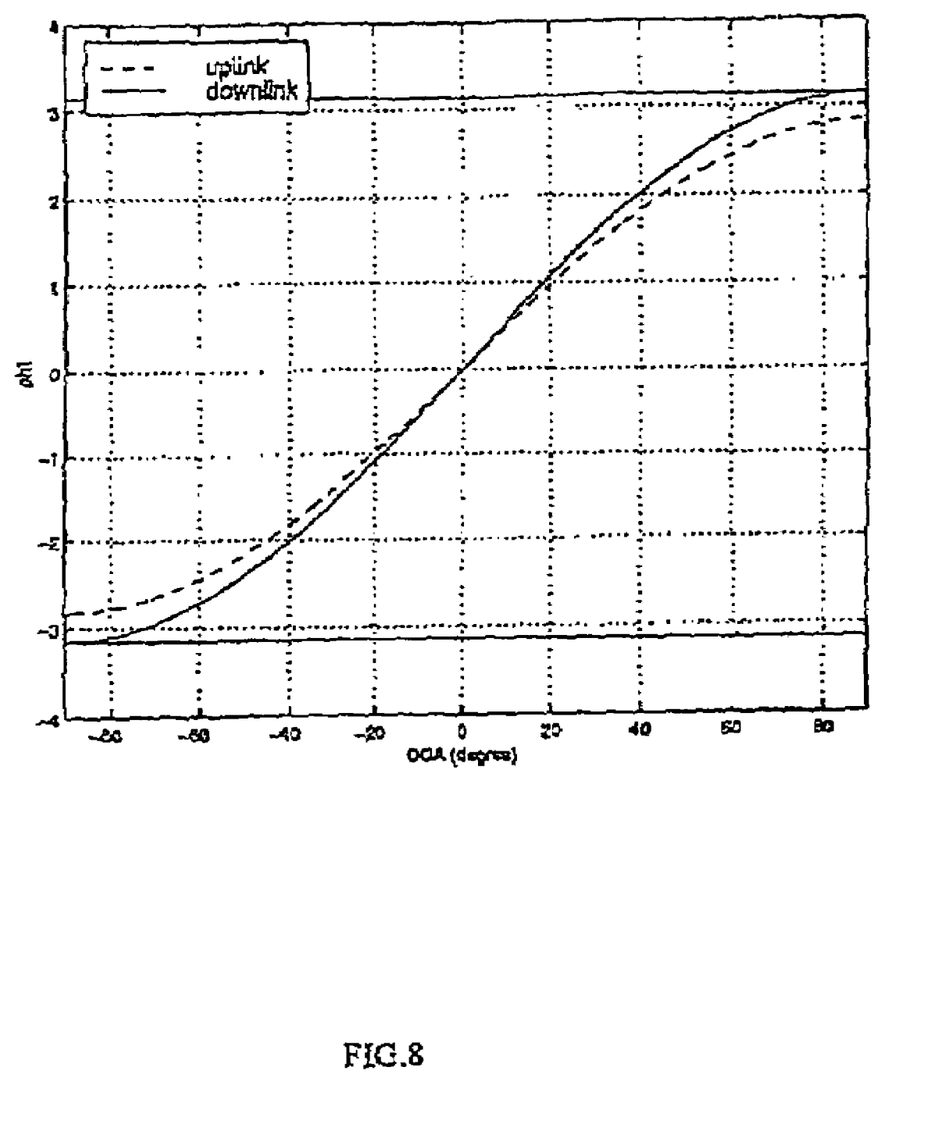
FIG. 8 illustrates the phase values of the first element of the uplink and downlink steering vectors for $z=\lambda_d/2$, $f_u=1.8$ GHz, $f_d=2.0$ GHZ.

According to one embodiment of the present invention which involves a pre-processing technique, the null-wrapping phenomenon can be avoided by proper selection of the antenna spacing for the antenna array. Specifically, if the antenna spacing is chosen as $z \leq \lambda_d/2$, no pseudo nulls will appear for the downlink. FIG. 8 shows the phase values of the first element of the uplink and downlink steering vectors when $z=\lambda_d/2$, $f_u=1.8$ GHz, $f_d=2.0$ GHz. It is seen that the phase values ($\phi$) for both links are all within $[-\pi,\pi]$, thus no null repeat problem exists.

The price for avoiding the null-wrapping phenomenon by choosing the antenna spacing as $z \leq \lambda_d/2$ is smaller system capacity for both uplink and downlink, This is because the smaller the antenna spacing, the wider the main beams, thus the antenna array is less capable of suppressing interference.

According to another embodiment of the present invention which involves a pre-processing technique, the null-wrapping phenomenon can be alleviated to a certain extent by a proper selection of the antenna spacing for the antenna array. Specifically, for ULA, the phase value ($\phi_d$), $2\pi z \sin(\theta)/\lambda_d$, of the second element of the downlink steering vector can be outside the interval $[-\pi,\pi]$, if the antenna spacing is chosen as $\lambda_d/2 < z \leq \lambda_u/2$. It is noted that for such a case the null-wrapping DOA threshold is $$\theta_0 = \arcsin\left(\frac{\lambda_d}{z} - 1\right),$$

and the smaller the antenna spacing, $z$, the larger the null-wrapping DOA threshold, $\theta_0$, and the smaller the possibility with which the nulls are outside the interval $[-\theta_0,\theta_0]$. Therefore, by choosing the spacing as $\lambda_d/2 < z \leq \lambda_u/2$, the null-wrapping phenomenon can be alleviated to a greater extent than is possible with the antenna spacing selected as $$z = \lambda_u/2.$$

According to another embodiment of the present invention which involves a pre-processing technique, the null-wrapping problem can also be alleviated via sectorisation to constrain all intended users located within a certain DOA interval which does not incur a null repeat problem. Specifically, for $z=\lambda_u/2$, $f_u=1.8$ GHz, $f_d=2.0$ GHZ, only the nulls outside the interval $[-53.1°,53.1°]$ will yield pseudo nulls. Therefore, if one cell is split into four sectors, then for the interesting sector, all users are within $[-45°,45°]$, and the useful uplink nulls are all within this interval, thus no pseudo nulls will be generated. As another example, for $f_u=1.8$ GHz, $f_d=2.0$ GHz, the DOA threshold for yielding null-wrapping phenomenon is $\theta_0=63.5°$ by choosing the antenna spacing as $z=(\lambda_u+\lambda_d)/4$, thus only the nulls outside the interval $[-63.5°,63.5°]$ will yield pseudo nulls. Therefore, if one cell is split into three sectors, then for the interesting sector, all users are within $[-60°,60°]$, and the useful uplink nulls are all within this interval, thus no pseudo nulls will be generated.

The above methods are classified as pre-processing techniques, as they are independent of the actual null positions which may be quite different for different user location distributions and/or traffic. However, after these system parameters are determined, the system may still have bad nulls. In this case, some post-processing methods can be used to deal with any remnant of the null-wrapping phenomenon.

According to another embodiment of the present invention which involves a post-processing technique, the null-wrapping phenomenon can be completely alleviated via a null-moving method 12 by moving any bad nulls to safe positions. Specifically, if the uplink null's DOA,$\theta_{u,k}$, satisfies the condition that $|\theta_{u,k}| \geq |\theta_0|$, and the generated pseudo null is near the uplink main beam, then $\theta_{u,k}$ is reset to be $\tilde{\theta}_{u,k}$ which is within the interval $[-|\theta_0|,|\theta_0|]$. There are many ways to reset $\theta_{u,k}$. Considering the mirroring property of the original null and the pseudo null, one simple method is to choose $\hat{\theta}_{u,k}=0°$, which means putting greater interference suppression at $\theta=0°$. Another more effective method is, if the DOAs of all users are known, to put $\hat{\theta}_{u,k}$ as the DOA with which high rate users are located, or large numbers of interfering users are located. When multiple bad nulls exist, these bad nulls can be moved to several positions in order to obtain larger interference suppression at the DOAs the designers want.

According to a further embodiment of the present invention, the null-wrapping problem can also be alleviated by the combination of the above three pre- and post-processing techiques. For example, for $f_u=1.8$ GHz, $f_d=2.0$ GHz, and $z=\lambda_u/2$, the null-wrapping DOA threshold is $\theta_0=53.1°$. Therefore, even though one cell is split into three sectors with which the useful nulls are within the interval [−60°, 60°], there are still bad nulls located in [−60°, 53.1°] and [53.1°, 60°]. In this case, the null-moving method 12 can be used to move the bad nulls to safe positions, which are within the interval [−53.1°, 53.1°]. Further examples comprise the proper selection of the antenna spacing as well as sectorisation or the combination of sectorisation and the null-moving method 12 as another option. It should be noted that the latter method is more effective. In fact, in the null-moving method 12, moving the bad nulls to a safe position is at the price of putting large antenna gain at the original bad null's position. However, since no effective users exist in the DOA interval near that position by virtue of sectorisation, there is little disadvantage. For a system having given antenna spacing and sectorisation, the null-moving method 12 is an advantageous technique for alleviating the null-wrapping problem.

Figure 9:
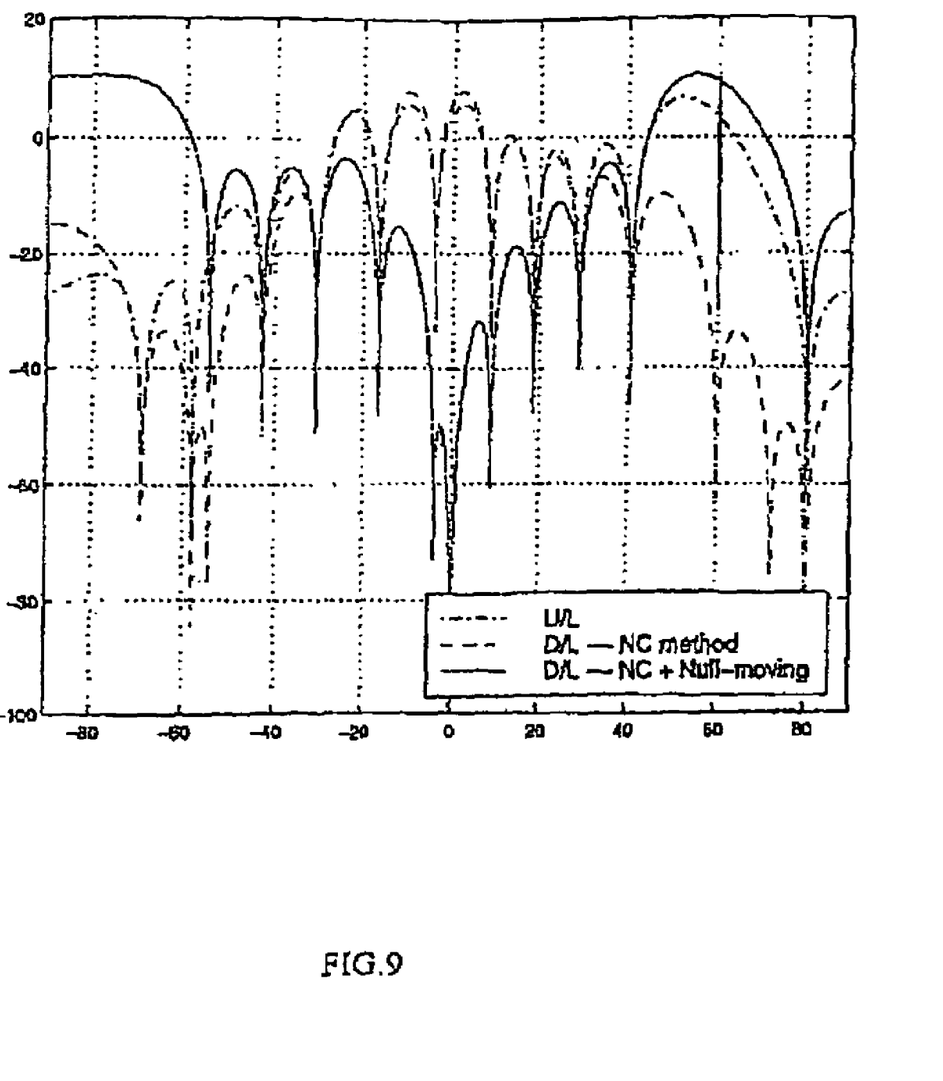
FIG. 9 shows the generated beam patterns for uplink and downlink using NC method and BES method (NC+null-moving technique).

FIG. 9 shows the generated beam patterns for uplink and downlink using NC method and BES method 10, the BES method 10 being a post-processing null-moving technique 12. Here the antenna number is 12. Suppose the desired user is located at $\theta=60°$. It is seen that the uplink main beam is below but in the same general direction as the desired user. The NC method keeps the uplink beam pattern's nulls for downlink, however, due to the presence of a null repeat problem, it also puts a null at $\theta=60°$, which means no matter what the transmission power from the base station is, assigned to this user, the desired user will never receive power. However, using the beam splitting (BES) method together with a null-moving technique as described above, by moving the two nulls at −58° and −69.1° to other places, the main beam in the direction of the desired user is near optimum, thus this user can still possess good downlink transmission.

The BES method not only keeps most nulls towards unintended users, but also keeps the main beam directed to the intended user, therefore the majority of available power is transmitted to the intended user, while less interference pollution is directed to the others. With all users' downlink beams generated by BES method, the required total transmitted power can be minimised in order for all users to be operating at the prescribed SINR threshold.

The invention claimed is:

1. A method for downlink beamforming in a frequency-division-duplex wireless communications system comprising a base station with an antenna array defining a communication cell and terminals that are physically remote from said base station, the method comprising the steps of:

dividing the communication cell into a plurality of sectors;

identifying uplink nulls which would yield pseudo nulls in a sector;

constraining use of the system to those terminals in a sector in which no pseudo nulls will be generated;

receiving at said base station antenna array combinations of arriving signals from said plurality of remote terminals, each signal having a beam pattern incorporating a main beam and one or more nulls;

identifying an uplink beamforming weight for a signal;

generating a downlink beamforming weight based on the signal's uplink beamforming weight using the null constraint method, wherein the null constraint method comprises determining an uplink beam pattern's nulls:

$z_{u,k}(i), i=1, \ldots, M-1,$ using a polynomial formed from the uplink beamforming weight:

$$\sum_{i=1}^{M} w_{u,k}(i) z^{-i+1} = w_{u,k}(1)(1 - z_{u,k}(1)z^{-1}) \ldots (1 - z_{u,k}(M-1)z^{-1});$$

transforming phase components of the uplink beam pattern's nulls and obtaining phase components of a downlink beam pattern's nulls as:

$$\varphi_{d,k}(i) = \frac{f_d}{f_u} \varphi_{u,k}(i), \text{ where } z_{u,k}(i) = A_{u,k}(i) e^{j\varphi_{u,k}(i)},$$

for $i=1, \ldots, M-1$; and constructing the downlink beam pattern's nulls:

$z_{d,k}(i) = A_{d,k}(i) e^{j\varphi_{d,k}(i)}$, for $i=1, \ldots, M-1$;

and constructing the downlink beamforming weight:

$$\sum_{i=1}^{M} w_{d,k}(i) z^{-i+1} = w_{d,k}(1)(1 - z_{d,k}(1)z^{-1}) \ldots (1 - z_{d,k}(M-1)z^{-1});$$

and transmitting downlink signals using downlink beamforming weights.

2. A base station for a wireless communications system, the base station comprising:

an uplink receiver antenna array for receiving arriving signals from a plurality of remote terminals on respective uplink channels;

a downlink weight generator operable to generate downlink weights based on a signal's uplink beamforming weight using the null constraint method;

a downlink transmit antenna array to transmit signals to the remote terminals in accordance with the generated downlink weights, the transmission cell of the antenna array being divided into a plurality of sectors;

means to identify uplink nulls which would yield pseudo nulls in a sector; and means to constrain use of the system to those terminals in a sector in which no pseudo nulls will be generated, wherein the null constraint method comprises determining an uplink beam pattern's nulls:

$z_{u,k}(i), i=1, \ldots, M-1,$ using a polynomial formed from the uplink beamforming weight:

$$\sum_{i=1}^{M} w_{u,k}(i)z^{-i+1} = w_{u,k}(1)(1 - z_{u,k}(1)z^{-1}) \ldots (1 - z_{u,k}(M-1)z^{-1});$$

transforming phase components of the uplink beam pattern's nulls and obtaining phase components of a downlink beam pattern's nulls as:

$$\varphi_{d,k}(i) = \frac{f_d}{f_u}\varphi_{u,k}(i), \text{ where } z_{u,k}(i) = A_{u,k}(i)e^{j\varphi_{u,k}(i)},$$

for i=1, . . . , M−1; and constructing the downlink beam pattern's nulls:

$z_{d,k}(i) = A_{d,k}(i)e^{j\varphi_{d,k}(i)}$, for $i=1, \ldots, M=1$;

and constructing the downlink beamforming weight:

$$\sum_{i=1}^{M} w_{d,k}(i)z^{-i+1} = w_{d,k}(1)(1 - z_{d,k}(1)z^{-1}) \ldots (1 - z_{d,k}(M-1)z^{-1}).$$

3. A communication system incorporating a base station according to claim 2 and a plurality of remote terminals.

* * * * *